(12) United States Patent
Rajakarunanayake et al.

(10) Patent No.: US 9,866,994 B2
(45) Date of Patent: Jan. 9, 2018

(54) LOCATIONING VIA STAGED ANTENNA UTILIZATION

(71) Applicant: Avago Technologies General IP (Singapore) Pte. Ltd., Singapore (SG)

(72) Inventors: Yasantha Rajakarunanayake, San Ramon, CA (US); Vinko Erceg, Cardiff, CA (US)

(73) Assignee: Avago Technologies General IP (Singapore) Pte. Ltd. (SG)

( * ) Notice: Subject to any disclaimer, the term of this patent is extended or adjusted under 35 U.S.C. 154(b) by 0 days.

(21) Appl. No.: 15/131,638

(22) Filed: Apr. 18, 2016

(65) Prior Publication Data

US 2016/0234640 A1    Aug. 11, 2016

Related U.S. Application Data

(63) Continuation of application No. 14/291,863, filed on May 30, 2014, now Pat. No. 9,320,007.

(Continued)

(51) Int. Cl.
*H04W 24/00* (2009.01)
*H04W 4/02* (2009.01)
(Continued)

(52) U.S. Cl.
CPC .................. *H04W 4/02* (2013.01); *G01S 5/00* (2013.01); *G01S 5/0268* (2013.01); *G01S 5/06* (2013.01); *G01S 5/10* (2013.01); *H04W 64/00* (2013.01)

(58) Field of Classification Search
CPC ............................. G01S 5/0252; H04W 64/00
(Continued)

(56) References Cited

U.S. PATENT DOCUMENTS 8,588,805 B2    11/2013  Grau Besoli et al.
8,892,125 B2 *  11/2014  Grau Besoli .......... H04B 7/084
                                                  455/456.1

(Continued)

*Primary Examiner* — Ronald Eisner
(74) *Attorney, Agent, or Firm* — Sterne, Kessler, Goldstein & Fox P.L.L.C.

(57) ABSTRACT

A communication network of the present disclosure can determine a location of a communication device, such as a mobile communication device, a wireless access point, and/or a base station to provide some examples, within its geographic coverage area based upon one or more communication signals that are communicated within the communication network and/or between the communication network and another communication network. The communication network can implement a multilateration technique to determine the location of the communication device based upon the one or more communication signals as received over various signal pathways. In an embodiment, the communication device can include multiple receiving antennas for receiving the one or more communication signals over multiple first signal pathways. The multilateration technique can use the one or more communication signals as received over the multiple first signal pathways to estimate a coarse location of the mobile communication device. Thereafter, the multilateration technique can, optionally, be used to effectively refine the coarse location based upon the one or more communication signals as received over multiple second signal pathways within the communication network to estimate a fine location of the mobile communication device.

19 Claims, 3 Drawing Sheets

Related U.S. Application Data

Figure 1:
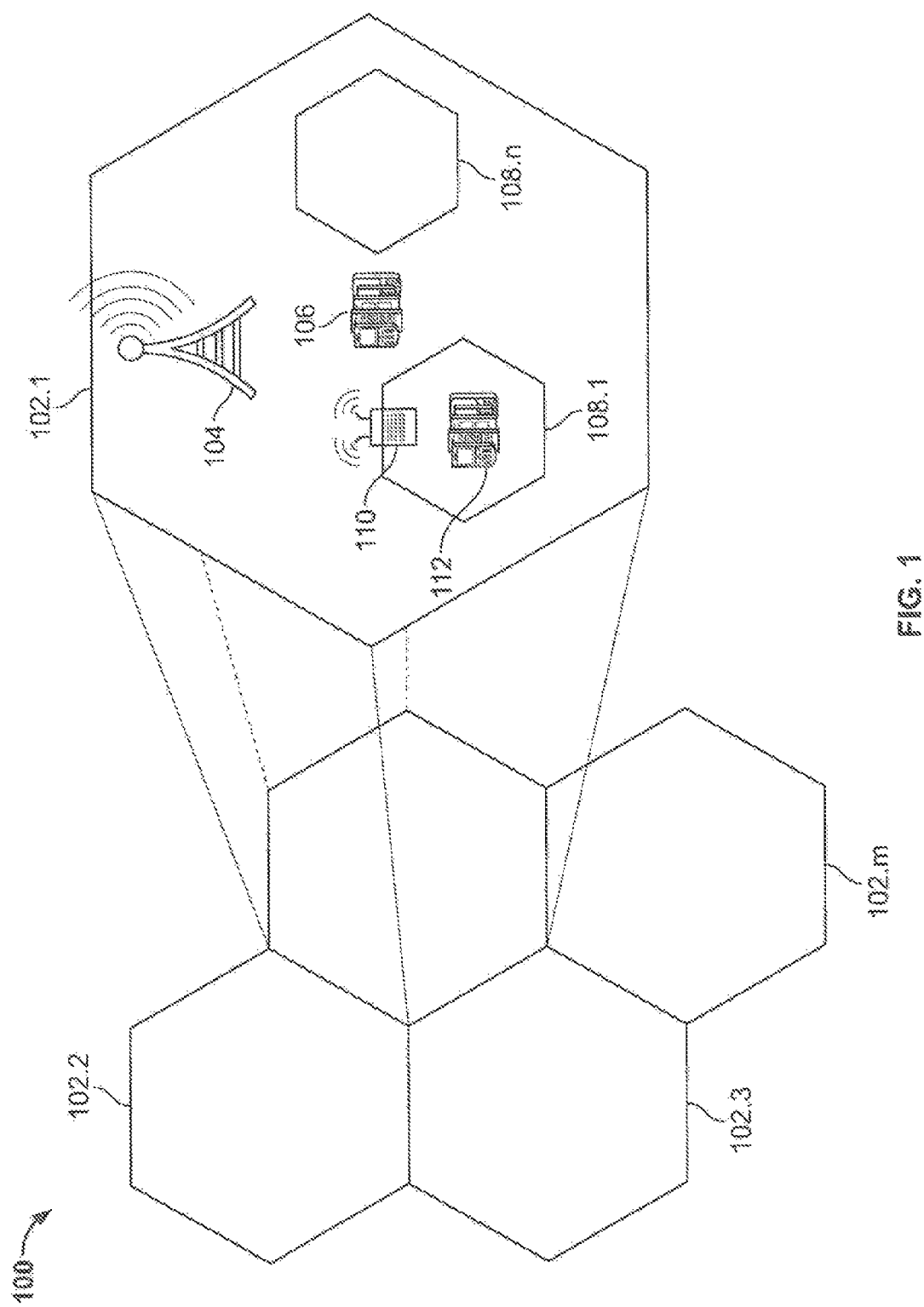

(60) Provisional application No. 61/829,638, filed on May 31, 2013, provisional application No. 61/953,125, filed on Mar. 14, 2014.

(51) Int. Cl.
*G01S 5/00* (2006.01)
*H04W 64/00* (2009.01)
*G01S 5/02* (2010.01)
*G01S 5/06* (2006.01)
*G01S 5/10* (2006.01)

(58) Field of Classification Search
USPC .................. 455/404.1, 404.2, 456.1–457; 340/539.13, 988–996
See application file for complete search history.

(56) References Cited

U.S. PATENT DOCUMENTS

| | | | |
|---|---|---|---|
| 2004/0078151 A1* | 4/2004 | Aljadeff | G01S 5/06 702/40 |
| 2007/0073513 A1* | 3/2007 | Posamentier | G01S 13/751 702/150 |

\* cited by examiner

LOCATIONING VIA STAGED ANTENNA UTILIZATION

CROSS-REFERENCE TO RELATED APPLICATIONS

This application claims the benefit of U.S. patent application Ser. No. 14/291,863, filed on May 30, 2014, now issued as U.S. Pat. No. 9,320,007, which claims the benefit of provisional application No. 61/829,638, filed on May 31, 2013, and provisional application No. 61/953,125, filed on Mar. 14, 2014, each of which is incorporated herein by reference in its entirety.

BACKGROUND

Field of Disclosure

The present disclosure relates generally to locating a mobile communication device within a communication network.

Related Art

A cellular network is a wireless network distributed over a geographic area that is divided into cells. Each cell is served by at least one fixed-location transceiver, known as a base station. The base station is responsible for handling traffic and signaling between communication devices and a network switching subsystem. When joined together, the cells provide communications over a wide geographic area. This enables mobile communication devices, such as mobile cellular telephones to provide an example, to communicate with each other, with base stations, and/or with other communication devices within the cellular network.

The mobile communication device represents a device that can initiate and receive communications over a radio link while moving around a wide geographic area. Knowing a physical location, or simply a location, of the mobile communication device within the cellular network can be beneficial to a user of the mobile communication device, as well as an operator of the cellular network. This allows the mobile communication device and/or the cellular network to provide location-based services (LBS) to the user. LBS represent various services that are provided to the users that depend upon the physical location of the mobile communication device. These services can include, for example, recommending social events in a city, requesting the nearest business or service such as an automated teller machine (ATM) or restaurant, turn by turn navigation to an address, locating people on a map, location-based mobile advertising, or contextualizing learning and research as well as many other services.

BRIEF DESCRIPTION OF THE DRAWINGS/FIGURES

The present disclosure is described with reference to the accompanying drawings. In the drawings, like reference numbers indicate identical or functionally similar elements. Additionally, the left most digit(s) of a reference number identifies the drawing in which the reference number first appears.

Figure 2:
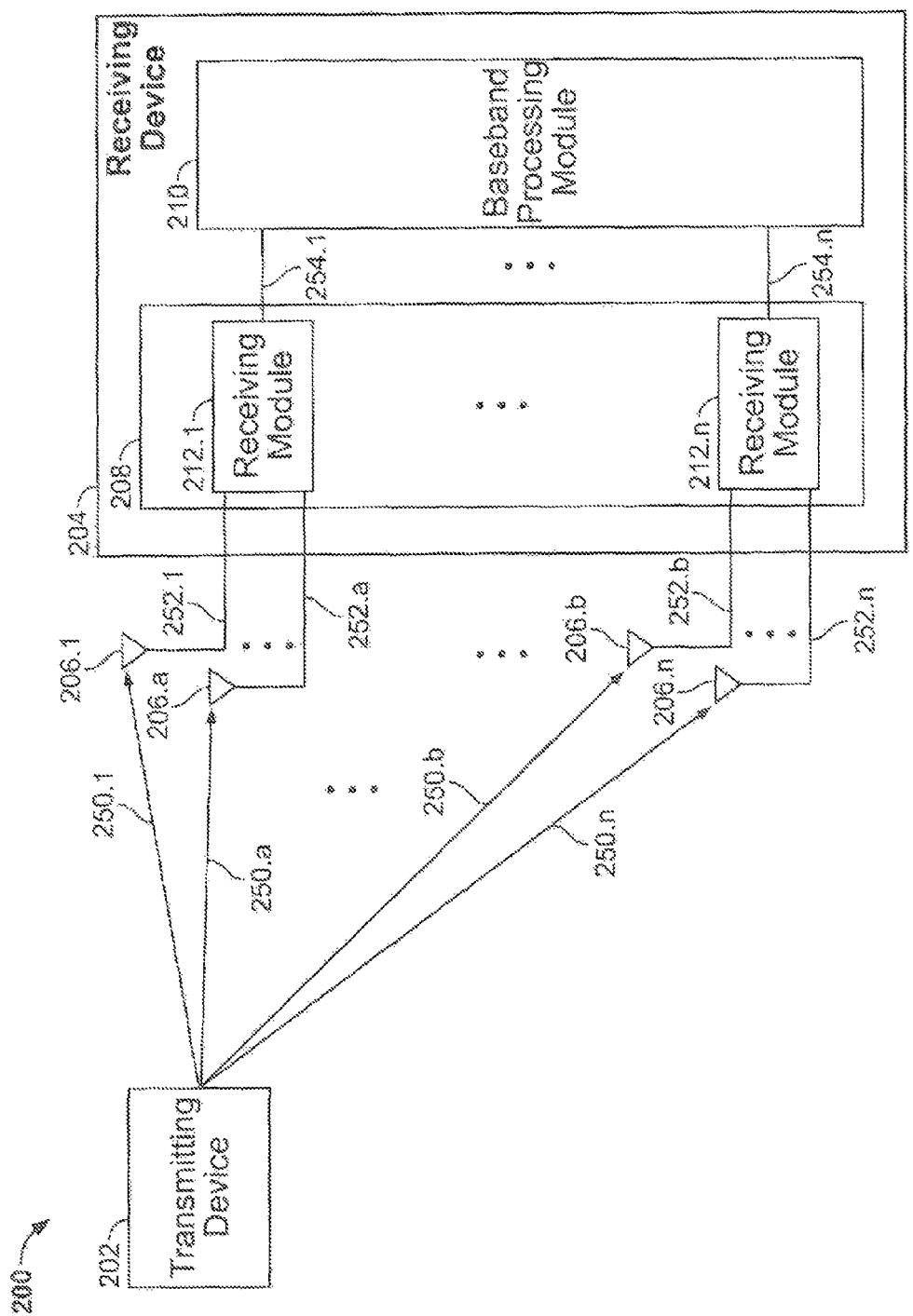
Figure 3:
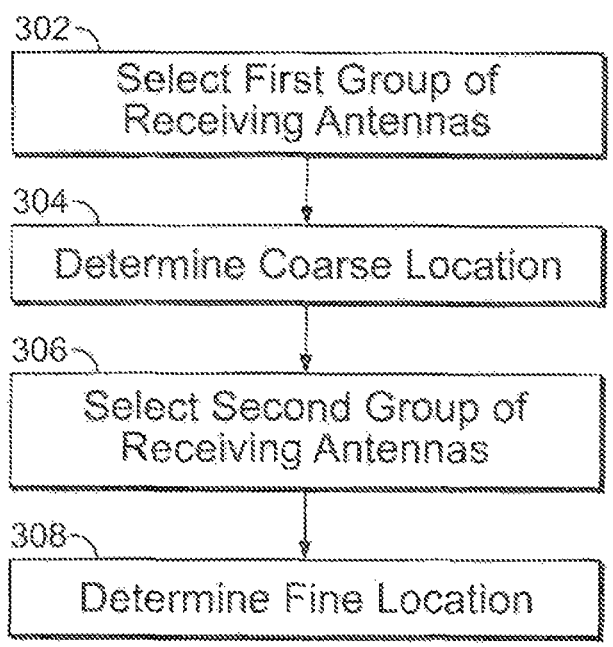

FIG. 1 illustrates a mixed communication network environment according to an exemplary embodiment of the present disclosure;

FIG. 2 illustrates a block diagram for estimating the location of an exemplary transmitting device and an exemplary receiving device that can be implemented within the mixed communication network environment according to an exemplary embodiment; and FIG. 3 is a flowchart of exemplary operational steps to determine the location of a mobile communication device according to an exemplary embodiment of the present disclosure.

The present disclosure will now be described with reference to the accompanying drawings. In the drawings, like reference numbers generally indicate identical, functionally similar, and/or structurally similar elements.

DETAILED DESCRIPTION OF THE DISCLOSURE

Overview

A communication network of the present disclosure can determine a location of a communication device, such as a mobile communication device, a wireless access point, and/or a base station to provide some examples, within its geographic coverage area based upon one or more communication signals that are communicated within the communication network and/or between the communication network and another communication network. The communication network can implement a multilateration technique to determine the location of the communication device based upon the one or more communication signals as received over various signal pathways. In an embodiment, the communication device can include multiple receiving antennas for receiving the one or more communication signals over multiple first signal pathways. The multilateration technique can use the one or more communication signals as received over the multiple first signal pathways to estimate a coarse location of the mobile communication device. Thereafter, the multilateration technique can, optionally, be used to effectively refine the coarse location based upon the one or more communication signals as received over multiple second signal pathways within the communication network to estimate a fine location of the mobile communication device.

Mixed Communication Environment According to an Exemplary Embodiment

FIG. 1 illustrates a mixed communication network environment according to an exemplary embodiment of the present disclosure. A mixed communication network environment 100 provides wireless communication capabilities to mobile communication devices within its geographic coverage area that is distributed over cells 102.1 through 102.m. The cells 102.1 through 102.m can include one or more base stations to provide cellular communication capabilities to the mobile communication devices, one or more wireless access points to provide wireless networking capabilities to the mobile communication devices, or any combination of the one or more base stations and the one or more wireless access points. The one or more base stations and/or the one or more wireless access points can determine one or more locations of the mobile communication devices within their corresponding cells 102.1 through 102.m. Once the one or more locations are determined, the one or more base stations and/or the one or more wireless access points can provide location-based services (LBS), or other services, to their corresponding mobile communication devices. It should be noted that the number of cells, base stations, wireless access points, and/or mobile communication devices within the mixed communication network 100 is for illustrative purposes only. Those skilled in the relevant art(s)

will recognize that a different number of cells, base stations, wireless access points, and/or mobile communication devices are possible without departing from the spirit and scope of the present disclosure. In the discussion to follow, operation of the cell 102.1 is to be described in further detail below. Those skilled in the relevant art(s) will recognize that the cells 102.2 through 102.m can operate in a substantially similar manner as the cell 102.1 without departing from the spirit and scope of the present disclosure.

As illustrated in FIG. 1, the cell 102.1 can include a base station 104 to provide the cellular communication capabilities to mobile communication devices 106. The base station 104 can communicate with the mobile communication devices 106 in accordance with one or more cellular communication standards or protocols. The one or more cellular communication standards or protocols can include various cellular communication standards such as a third Generation Partnership Project (3GPP) Long Term Evolution (LTE) communication standard, a fourth generation (4G) mobile communication standard, a third generation (3G) mobile communication standard to provide some examples.

As additionally, illustrated in FIG. 1, the cell 102.1 can include one or more wireless local area networks (WLANs) 108.1 through 108.n to provide the wireless networking capabilities to mobile communication devices. It should be noted that the number of WLANs within the cell 102.1 is for illustrative purposes only. Those skilled in the relevant art(s) will recognize that a different number of WLANs are possible without departing from the spirit and scope of the present disclosure. In the discussion to follow, operation of the WLAN 108.1 is to be described in further detail below. Those skilled in the relevant art(s) will recognize that the WLANs 108.2 through 108.n can operate in a substantially similar manner as the WLAN 108.1 without departing from the spirit and scope of the present disclosure. The WLAN 108.1 can include a wireless access point 110 and mobile communication devices 112. The wireless access point 110 can provide the wireless networking capabilities to the mobile communication devices 112 within its geographic coverage area. The wireless access point 110 can communicate with the mobile communication devices 112 in accordance with one or more wireless networking standards or protocols. The one or more wireless networking standards or protocols can include an Institute of Electrical and Electronics Engineers (IEEE) 802.11 communication standard or any other Wi-Fi wireless network communication standard or protocol to provide some examples. In an exemplary embodiment, the wireless access point 110 is located within a coverage area of the base station 104 that is characterized as being poor, for example, within a residential building, an office building, or a commercial building to provide some examples. In another exemplary embodiment, more than one wireless access point 110 can be located within the residential building, the office building, or the commercial building.

As the mobile communication devices 106 and/or the mobile communication devices 112 roam, it can be beneficial for the mixed communication network environment 100 to determine the location of the mobile communication devices 106 and/or the mobile communication devices 112 within its geographic coverage area. This allows the mixed communication network environment 100 to provide location-based services (LBS), or other services, to the mobile communication devices 106 and/or the mobile communication devices 112.

The communication network environment 100 can implement a multilateration technique to determine a location of the base station 104, the mobile communication devices 106, the wireless access point 110, and/or the mobile communication devices 112. Typically, the base station 104, the mobile communication devices 106, the wireless access point 110, and/or the mobile communication devices 112 include multiple receiving antennas for receiving one or more communication signals. The multiple receiving antennas can include multiple groupings of receiving antennas such as a first grouping of receiving antennas or a second grouping of receiving antennas to provide some examples.

The multilateration technique can select the first grouping of receiving antennas from among the multiple receiving antennas. Thereafter, the multilateration technique can use the one or more communication signals as received over the first grouping of receiving antennas over a first set of signal pathways within the communication network environment 100 to estimate one or more coarse locations of the location of the base station 104, the mobile communication devices 106, the wireless access point 110, and/or the mobile communication devices 112. For example, the base station 104, the mobile communication devices 106, the wireless access point 110, and/or the mobile communication devices 112 can determine one or more characteristics, such as one or more amplitudes and/or one or more phases to provide some examples, of the one or more communication signals as received over the first grouping of receiving antennas over the first set of signal pathways. Thereafter, base station 104, the mobile communication devices 106, the wireless access point 110, and/or the mobile communication devices 112 can determine one or more properties, such as one or more Angle of Arrivals (AoAs), based upon the one or more characteristics to estimate the one or more coarse locations of the location of the base station 104, the mobile communication devices 106, the wireless access point 110, and/or the mobile communication devices 112. It should be noted that the one or more AoAs can alternatively be described as being one or more Angle of Departures (AoD) that will be apparent to those skilled in the relevant art(s) without departing from the spirit and scope of the present disclosure.

In an exemplary embodiment, the multilateration technique can approximate the one or more AoAs by evaluating the following:

$$\theta = \cos^{-1}\left(\frac{n\lambda}{d}\right), \quad (1)$$

where $\theta$ represents the AoA, n represents an integer number, $\lambda$ represents a wavelength of the one or more communication signals, and d represents a distance between receiving antennas within the first grouping of receiving antennas. Typically, the distance d represents a physical distance, such as a spatial distance or an angular distance between the receiving antennas within the first and/or the second groupings of receiving antennas. In an exemplary embodiment, the distance d between the receiving antennas within the second grouping of receiving antennas is larger than the distance d between the receiving antennas within the first grouping of receiving antennas.

Thereafter, the multilateration technique can, optionally, be used to effectively refine the coarse location based upon the one or more communication signals as received over the second grouping of receiving antennas over a second set of signal pathways within the communication network environment 100 to estimate one or more fine locations of the base station 104, the mobile communication devices 106, the wireless access point 110, and/or the mobile communication devices 112. The multilateration technique can select the second grouping of receiving antennas from among the multiple receiving antennas to perform this refinement. Thereafter, the base station 104, the mobile communication devices 106, the wireless access point 110, and/or the mobile communication devices 112 can determine the one or more characteristics of the one or more communication signals as received over the second grouping of receiving antennas over the second set of signal pathways. Thereafter, base station 104, the mobile communication devices 106, the wireless access point 110, and/or the mobile communication devices 112 can determine the one or more properties to estimate the one or more fine locations of the base station 104, the mobile communication devices 106, the wireless access point 110, and/or the mobile communication devices 112.

In an exemplary embodiment, the multilateration technique can evaluate EQ (1) using the distance d between the receiving antennas within the second grouping of receiving antennas to determine another AoA as the one or more fine locations. However, the multilateration technique can provide multiple estimates for the one or more fine locations when determining the one or more properties of the one or more communication signals as received over the second grouping of receiving antennas over the second set of signal pathways. The multilateration technique can utilize the one or more coarse locations to select one of the multiple estimates as the one or more fine locations. For example, the multilateration technique can estimate that a coarse location of one of the mobile communication devices 106 is within a first quadrant, namely between approximately 0 degrees and approximately 90 degrees from the wireless access point 110. In this example, the multilateration technique can estimate the one or more fine locations as being within a portion of the first quadrant, namely between approximately 30 degrees and approximately 60, or within a portion of a third quadrant, namely between approximately 210 degrees and approximately 240 degrees, from the wireless access point 110. In this example, the multilateration technique can estimate the one or more fine locations as being within the portion of the first quadrant based upon the one or more coarse locations being within the first quadrant.

Alternatively, or in addition to, the multilateration technique can adjust the wavelength $\lambda$ of the one or more communication signals in a similar manner as the distance d to determine the one or more coarse locations and/or the one or more fine locations. For example, the base station 104, the mobile communication devices 106, the wireless access point 110, and/or the mobile communication devices 112 can determine one or more characteristics, such as one or more amplitudes and/or one or more phases to provide some examples, of the one or more communication signals at a first frequency, or first band of frequencies, as received over the first grouping of receiving antennas over the first set of signal pathways to estimate the one or more coarse locations. In this example, the base station 104, the mobile communication devices 106, the wireless access point 110, and/or the mobile communication devices 112 can determine one or more characteristics, such as one or more amplitudes and/or one or more phases to provide some examples, of the one or more communication signals at a second frequency, or second band of frequencies, as received over the first grouping of receiving antennas over the first set of signal pathways to estimate the one or more fine locations. In an exemplary embodiment, the wavelength $\lambda$ of the one or more communication signals used to estimate the one or more coarse locations is larger than the wavelength $\lambda$ of the one or more communication signals used to estimate the one or more fine locations. It should be noted that any combination of selecting the distance d between the receiving antennas and the wavelength $\lambda$ of the one or more communication signals can be used by the multilateration technique to estimate the one or more coarse locations and/or the one or more fine locations.

Although FIG. 1 has been described as the mobile communication devices 106 and/or the mobile communication devices 112 determining their locations within the mixed communication network environment 100, those skilled in the relevant art(s) will recognize that the base station 104 and/or the wireless access point 110 can determine their locations within the mixed communication network environment 100 in a substantially similar manner that will be apparent to those skilled in the relevant art(s) without departing from the spirit and scope of the present disclosure.

Exemplary Mobile Communication Device Location Estimate

FIG. 2 illustrates a block diagram for estimating the location of an exemplary transmitting device and an exemplary receiving device that can be implemented within the mixed communication network environment according to an exemplary embodiment. A communication environment 200 provides wireless communication capabilities between a transmitting device 202 and a receiving device 204. The transmitting device 202 can represent an exemplary embodiment of one or more of the mobile communication devices 106 and/or the mobile communication devices 112 and the receiving device 204 can represent an exemplary embodiment of the base station 104 and/or the wireless access point 110. Alternatively, the transmitting device 202 can represent an exemplary embodiment of the base station 104 and/or the wireless access point 110 and the receiving device 204 can represent an exemplary embodiment of one or more of the mobile communication devices 106 and/or the mobile communication devices 112.

The receiving device 204 observes a communication signal provided by the transmitting device 202 as the communication signal passes through a communication channel. As illustrated in FIG. 2, the receiving device 204 includes one or more antennas 206.1 through 206.n to observe the communication signal. In an exemplary embodiment, the one or more antennas 206.1 through 206.n can be separated into one or more groups of antennas. In this exemplary embodiment, a first group of antennas includes antennas 206.1 through 206.a and a second group of antennas includes antennas 206.b through 206.n. However, this exemplary embodiment is not limiting, those skilled in the relevant art(s) will recognize that the one or more groups of antennas can include any suitable number of the one or more antennas 206.1 through 206.n, such as one antenna from among the one or more antennas 206.1 through 206.n to provide an example, without departing from the spirit and scope of present disclosure.

As additionally illustrated in FIG. 2, each of the antennas 206.1 through 206.n observes the communication signal as it passes through the communication channel along a corresponding signal pathway 250.1 through 250.n to provide observed communication signals 252.1 through 252.n. For example, a first signal pathway 250.1 represents a first signal pathway that the communication signal traverses from the transmitting device 202 through the communication channel before being observed by the antenna 206.1. The signal pathways 250.1 through 250.n can have differing propagation characteristics such that the one or more characteristics of the communication signal can differ along each of the signal pathways 250.1 through 250.*n*. The difference in the one or more characteristics of the communication signal along each of the signal pathways 250.1 through 250.*n* can be used by the receiving device 204 to determine the location of the transmitting device 202.

As additionally illustrated in FIG. 2, the receiving device 204 includes a communication receiving module 208 to process the observed communication signals 252.1 through 252.*n* to provide observed communication sequences 254.1 through 254.*n*. The communication receiving module 208 includes receiving modules 212.1 through 212.*n*, each of the receiving modules 212.1 through 212.*n* processes a corresponding one of the observed communication signals 252.1 through 252.*n* to provide a corresponding one of the observed communication sequences 254.1 through 254.*n*. In an exemplary embodiment, the receiving modules 212.1 through 212.*n* process the observed communication signals 252.1 through 252.*n* in accordance with the one or more communication standards or protocols. In this exemplary embodiment, the observed communication sequences 254.1 through 254.*n* represent digital representations of the observed communication signals 252.1 through 252.*n* which have undergone processing in accordance with the one or more communication standards or protocols. This processing can include filtering, gain, noise, and/or phase compensation, equalization, error correction, analog to digital conversion to provide some examples. Additionally, the receiving modules 212.1 through 212.*n* can determine one or more characteristics, such as amplitude and/or phase to provide some examples, of their corresponding communication sequences 254.1 through 254.*n*.

As further illustrated in FIG. 2, the receiving device 204 includes a baseband processing module 210 to process the observed communication sequences 254.1 through 254.*n* and the one or more characteristics. The baseband processing module 210 can receive the one or more characteristics as part of the observed communication sequences 254.1 through 254.*n*, referred to as a soft decision, or can receive the observed communication sequences 254.1 through 254.*n* separate from the one or more characteristics, referred to as a hard decision.

The baseband processing module 210 can estimate a coarse location of the transmitting device 202 based upon the communication signal as received over a first grouping of receiving antennas from among the antennas 206.1 through 206.*n* over a first set of signal pathways from among the signal pathways 250.1 through 250.*n*. The baseband processing module 210 can select the first grouping of receiving antennas by activating corresponding receiving modules from among the receiving modules 212.1 through 212.*n* and deactivating non-corresponding receiving modules from among the receiving modules 212.1 through 212.*n*, selecting corresponding observed communication sequences from among the observed communication sequences 254.1 through 254.*n*, and/or any other suitable manner that will be apparent to those skilled in the relevant art(s). For example, the baseband processing module 210 can select a first group of the observed communication sequences 254.1 through 254.*n*. Thereafter, the baseband processing module 210 can analyze this first group of the observed communication sequences 254.1 through 254.*n* to determine one or more corresponding properties, such as Angle of Arrival (AoA), of the first group of the observed communication sequences 254.1 through 254.*n* based upon their one or more signal characteristics to estimate the coarse location of the transmitting device 202. The baseband processing module 210, for example, may determine a first phase difference and/or a first time difference between the observed communication signal 252.1 received at the first receiving module 212.1 as compared to the observed communication signal 252.2 received at the second receiving module 212.2. Analogously, there may be a second phase difference and/or a second time difference between the observed communication signal 252.2 received at the second receiving module 212.2 and the observed communication signal 252.*n* received at the receiving module 212.*n*. Similarly, there may be a $n^{th}$ phase difference and/or a $n^{th}$ time difference between the observed communication signal 252.1 received at the first receiving module 212.1 and the observed communication signal received at the receiving module 212.*n*.

In an exemplary embodiment, the baseband processing module 210 can calculate a beamforming matrix for the first group of the observed communication sequences 254.1 through 254.*n* and the one or more properties based upon the beamforming matrix. For example, the baseband processing module 210 can calculate the beamforming matrix and can determine one or more differences between coefficients within the beamforming matrix based on beamforming calculations and operations upon the beamforming matrix to determine the one or more properties of the first group of the observed communication sequences 254.1 through 254.*n*. The beamforming calculations and operations can include, for example, an implicit beamforming technique known in the art, for example, an IEEE 802.11 implicit beamforming technique.

In another exemplary embodiment, the baseband processing module 210 can access a look-up table corresponding to the one or more characteristics of the first group of the observed communication sequences 254.1 through 254.*n* to determine the one or more properties of the first group of the observed communication sequences 254.1 through 254.*n*. For example, the baseband processing module 210 can access a look-up table corresponding to the measured phases and/or amplitudes of the communication signal as received over the signal pathways 250.1 through 250.*n* and can provide the AoA from the look-up table based upon the measured phases and/or amplitudes.

Next, the baseband processing module 210 can, optionally, effectively refine the coarse location of the transmitting device 202 based upon the communication signal as received over a second grouping of receiving antennas from among the antennas 206.1 through 206.*n* over a second set of signal pathways from among the signal pathways 250.1 through 250.*n* to estimate a fine location of the transmitting device 202. The baseband processing module 210 can select the second grouping of receiving antennas by activating corresponding receiving modules from among the receiving modules 212.1 through 212.*n* and deactivating non-corresponding receiving modules from among the receiving modules 212.1 through 212.*n*, selecting corresponding observed communication sequences from among the observed communication sequences 254.1 through 254.*n*, and/or any other suitable manner that will be apparent to those skilled in the relevant art(s). In an exemplary embodiment, a distance between antennas 206.1 through 206.*n* within the second grouping of receiving antennas is larger than a distance between antennas 206.1 through 206.*n* within the first grouping of receiving antennas.

For example, the baseband processing module 210 can select a second group of the observed communication sequences 254.1 through 254.*n*. Thereafter, the baseband processing module 210 can analyze this second group of the observed communication sequences 254.1 through 254.*n* to determine one or more corresponding properties, such as Angle of Arrival (AoA), of the second group of the observed communication sequences 254.1 through 254.$n$ based upon their one or more signal characteristics to estimate the fine location of the transmitting device 202.

However, in some situations, the baseband processing module 210 can provide multiple estimates for the fine location when determining the AoA of the communication signal as received over the second grouping of receiving antennas over the second set of signal pathways. The baseband processing module 210 can utilize the coarse locations to select one of these multiple estimates as the fine location. For example, the baseband processing module 210 can estimate that a coarse location of the transmitting device 202 is within a first quadrant, namely between approximately 0 degrees and approximately 90 degrees from the wireless access point 110. In this example, the baseband processing module 210 can estimate the fine location as being within a portion of the first quadrant, namely between approximately 30 degrees and approximately 60, or within a portion of a third quadrant, namely between approximately 210 degrees and approximately 240 degrees, from the wireless access point 110. In this example, the baseband processing module 210 can estimate the fine location as being within the portion of the first quadrant based upon the coarse locations being within the first quadrant.

Method for Locating a Mobile Communication Device

FIG. 3 is a flowchart of exemplary operational steps to determine the location of a mobile communication device according to an exemplary embodiment of the present disclosure. The disclosure is not limited to this operational description. Rather, it will be apparent to persons skilled in the relevant art(s) from the teachings herein that other operational control flows are within the scope and spirit of the present disclosure. The following discussion describes the steps in FIG. 3.

At step 302, the operational control flow observes a communication signal from a communication device using a plurality of receiving antennas. The operational control flow selects corresponding signals that are observed by a first group of receiving antennas from among the plurality of receiving antennas.

At step 304, the operational control flow determines one or more properties, such as Angle of Arrival to provide an example, of the signals that are observed by the first group of receiving antennas to estimate a coarse location of the communication device.

At step 306, the operational control flow selects corresponding signals that are observed by a second group of receiving antennas from among the plurality of receiving antennas.

At step 308, the operational control flow determines one or more properties, such as Angle of Arrival to provide an example, of the signals that are observed by the second group of receiving antennas to estimate a fine location of the communication device. In some situations, the one or more properties determined in step 308 have multiple estimates. In these situations, the operational control can estimate the fine location of the communication device based upon the coarse location of the communication device.

CONCLUSION

The following Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limit the disclosure. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes, and are not intend to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

References in the disclosure to a "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

What is claimed is:

1. A first communication device, comprising:
    a plurality of receiving antennas,
    wherein a first group of antennas from among the plurality of receiving antennas is configured to receive a first plurality of communication signals from a second communication device, and
    wherein a second group of antennas from among the plurality of receiving antennas is configured to receive a second plurality of communication signals; and
    a processor configured to:
        estimate a first location of the second communication device based upon the received first plurality of communication signals,
        estimate a plurality of second locations of the second communication device based upon the received second plurality of communication signals, and
        select a location of the second communication device from among the plurality of second locations that corresponds to the first location.

2. The first communication device of claim 1, wherein the processor is further configured to determine a property of the first plurality of communication signals to estimate the first location.

3. The first communication device of claim 1, wherein the processor is further configured to determine a plurality of properties of the second plurality of communication signals to estimate the plurality of second locations.

4. The first communication device of claim 1, wherein the first communication device is configured to operate in accordance with an Institute of Electrical and Electronics Engineers (IEEE) 802.11 communication standard or protocol.

5. A first communication device, comprising:
    a plurality of receiving antennas configured to receive a communication signal provided over a plurality of signal pathways; and
    a processor configured to:
        estimate a first location of a second communication device based upon a first plurality of communication signals observed over a first plurality of signal pathways from among the plurality of signal pathways by a first group of antennas from among the plurality of receiving antennas,
        estimate a plurality of second locations of the second communication device based upon a second plurality of communication signals observed over a second plurality of signal pathways from among the plurality of signal pathways by a second group of antennas from among the plurality of receiving antennas, and
        select a location of the second communication device from among the plurality of second locations that corresponds to the first location.

6. The first communication device of claim 5, wherein the processor is configured to determine a property of the first plurality of communication signals to estimate the first location.

7. The first communication device of claim 5, wherein the processor is configured to determine a plurality of properties of the second plurality of communication signals to estimate the plurality of second locations.

8. The first communication device of claim 5, wherein the first communication device is configured to operate in accordance with an Institute of Electrical and Electronics Engineers (IEEE) 802.11 communication standard or protocol.

9. A method for estimating a location of a first communication device, the method comprising:
    receiving, by a second communication device, a communication signal provided over a plurality of signal pathways by the first communication device;
    estimating, by the second communication device, a first location of the first communication device based upon a first plurality of communication signals received over a first plurality of signal pathways;
    estimating, by the second communication device, a plurality of second locations of the first communication device based upon a second plurality of communication signals received over a second plurality of signal pathways, and
    selecting, by the second communication device, the location of the first communication device from among the plurality of second locations that corresponds to the first location.

10. The method of claim 9, wherein the estimating the first location comprises determining a property of the first plurality of communication signals to estimate the first location.

11. The method of claim 9, wherein the estimating the plurality of second locations comprises determining a plurality of properties of the second plurality of communication signals to estimate the plurality of second locations.

12. The first communication device of claim 1, wherein the first location is within a quadrant from among a plurality of quadrants,
    wherein each second location from among the plurality of second locations is within a corresponding quadrant from among the plurality of quadrants,
    wherein the processor is configured to select the location of the second communication device from among the plurality of second locations that corresponds to the quadrant of the first location.

13. The first communication device of claim 12, wherein the plurality of quadrants comprises:
    a plurality of quadrants of a two-dimensional Cartesian system.

14. The first communication device of claim 1, wherein the first communication device comprises:
    a base station; or
    a wireless access point, and
    wherein the second communication device comprises:
        a mobile communication device within a coverage area of the first communication device.

15. The first communication device of claim 5, wherein the first location is within a quadrant from among a plurality of quadrants, wherein each second location from among the plurality of second locations is within a corresponding quadrant from among the plurality of quadrants, and wherein the processor is configured to select the location of the second communication device from among the plurality of second locations that corresponds to the quadrant of the first location.

16. The first communication device of claim 15, wherein the plurality of quadrants comprises:
a plurality of quadrants of a two-dimensional Cartesian system.

17. The first communication device of claim 5, wherein the first communication device comprises:
a base station; or
a wireless access point, and
wherein the second communication device comprises:
a mobile communication device within a coverage area of the first communication device.

18. The method of claim 9, wherein the first location is within a quadrant from among a plurality of quadrants,
wherein each second location from among the plurality of second locations is within a corresponding quadrant from among the plurality of quadrants, and
wherein the selecting comprises:
selecting the location of the first communication device from among the plurality of second locations that corresponds to the quadrant of the first location.

19. The method of claim 18, wherein the plurality of quadrants comprises:
a plurality of quadrants of a two-dimensional Cartesian system.

* * * * *

UNITED STATES PATENT AND TRADEMARK OFFICE
CERTIFICATE OF CORRECTION

PATENT NO. : 9,866,994 B2
APPLICATION NO. : 15/131638
DATED : January 9, 2018
INVENTOR(S) : Rajakarunanayake et al.

It is certified that error appears in the above-identified patent and that said Letters Patent is hereby corrected as shown below:

On the Title Page

In item (56) References Cited, please replace:
8,892,125 B2* 11/2014 Grau Besoli
With:
8,892,125 B2* 11/2014 Grau Besoli et al.

Signed and Sealed this
Fourth Day of June, 2019

Andrei Iancu
*Director of the United States Patent and Trademark Office*